(No Model.)

W. G. HOLMES.
ELLIPTIC SPRING.

No. 381,925.      Patented May 1, 1888.

Attest:
John Schuman.
Edmond T. Scully.

Inventor:
William G. Holmes.
by his Atty
Charles J. Hunt.

UNITED STATES PATENT OFFICE.

WILLIAM G. HOLMES, OF DETROIT, MICHIGAN, ASSIGNOR OF ONE-HALF TO THE DETROIT STEEL AND SPRING WORKS, OF SAME PLACE.

ELLIPTIC SPRING.

SPECIFICATION forming part of Letters Patent No. 381,925, dated May 1, 1888.

Application filed November 18, 1887. Serial No. 255,512. (No model.)

*To all whom it may concern:*

Be it known that I, WILLIAM G. HOLMES, of Detroit, in the county of Wayne and State of Michigan, have invented new and useful Improvements in Elliptic Springs; and I do hereby declare that the following is a full, clear, and exact description thereof, reference being had to the accompanying drawings, which form a part of this specification.

My invention relates to certain improvements in the heads which are formed at the ends of elliptic springs for the purpose of uniting the upper and lower springs with a firm and elastic joint; and the invention consists in making a recess in the ends of the main upper leaf, the lips of each side of this recess being turned down over shoulders formed on the main lower leaf, while the tongues between such shoulders on the main lower leaf engage into the recesses or slots formed in the upper leaf, as more fully hereinafter described.

Figure 1:
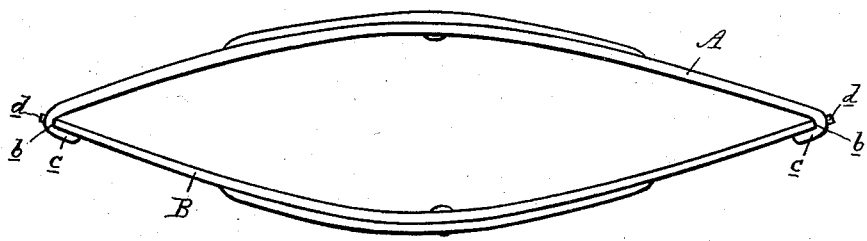
Figure 2:
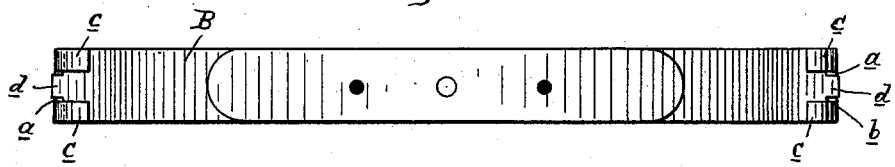

Figure 1 is an elevation of my improved spring. Fig. 2 is a bottom view thereof.

In the accompanying drawings, which form a part of this specification, A represents the main upper leaf of my improved spring, in the ends of which are cut, or otherwise suitably formed, right angled recesses *a*, leaving the lips *c c* on the sides of each recess.

B is the main lower leaf of my improved spring, which is cut away at the ends to form the shoulders *b* and tongues *d*.

When the leaves are placed in position, the lips *a* at the end of the upper main leaf are turned down and back over the shoulders *b* of the main lower leaf and lock the leaves against any lateral displacement. The hooked lips of the upper main leaf embrace the shoulders of the main lower leaf, and the tongues of the main lower leaf enter the recesses in the main upper leaf, thereby forming a simple and durable head for the elliptic spring.

In place of the recess cut in the end of the upper main leaf a slot, either open or blind, may be formed therein, with which the tongues of the lower main leaf could be made to engage, and the end of the upper main leaf, which is turned down over the shoulders, would extend across the lower main leaf in a continuous body. This is but a change in the form of my invention.

Whenever it may be desired to use a half-spring by itself, the tongues and shoulders of the lower main leaf may be made to engage with a suitable clip or fastening attached to the bolster or other portion of the vehicle in connection with which it may be employed. When the upper half-spring is used separately, it may be connected to the gearing or to another spring by means of a suitable clip passing in the recess and under the upturned lips.

It will readily be seen that my spring, which is very cheaply constructed as compared with ordinary elliptic springs, is equally durable and effective.

I attach special importance to my tongue and shoulders on the lower leaf, which prevent lateral play of the leaves, allow them to expand to their fullest extent, and yet the shoulders will serve as stops to limit their movement.

What I claim as my invention is—

In an elliptic spring, the combination of the upper main leaf provided with recesses and downturned lips at its ends, said lips being adapted to embrace the shoulders formed upon the main lower leaf and lock such leaf in position, with the lower main leaf provided with shoulders and tongues at its ends, said tongues being on the same curve with the body of the leaf and adapted to enter the recesses in the upper main leaf for the purpose of locking the leaves against lateral displacement, and free to move endwise therein, substantially as and for the purposes set forth.

WILLIAM G. HOLMES.

Witnesses:
J. H. CLEGG,
EDMOND J. SCULLY.